US00RE48957E

(19) United States
(12) Reissued Patent
Keily et al.

(10) Patent Number: US RE48,957 E
(45) Date of Reissued Patent: Mar. 8, 2022

(54) ELECTRO-MECHANICAL PAPER SHEET MATERIAL DISPENSER WITH TAIL SENSOR

(71) Applicant: Dispensing Dynamics International, Inc., San Marcos, CA (US)

(72) Inventors: Joel P. Keily, Corona, CA (US); Richard Dale Brannan, Jr., Hacienda Heights, CA (US)

(73) Assignee: DISPENSING DYNAMICS INTERNATIONAL, INC., San Marcos, CA (US)

(21) Appl. No.: 15/944,991

(22) Filed: Apr. 4, 2018

Related U.S. Patent Documents

Reissue of:
(64) Patent No.: 9,730,559
Issued: Aug. 15, 2017
Appl. No.: 14/249,434
Filed: Apr. 10, 2014

(51) Int. Cl.
*A47K 10/36* (2006.01)

(52) U.S. Cl.
CPC ..... *A47K 10/3625* (2013.01)

(58) Field of Classification Search
CPC ..... A47K 10/3625
USPC ..... 225/14; 242/563
See application file for complete search history.

(56) References Cited

U.S. PATENT DOCUMENTS

| | | | |
|---|---|---|---|
| 790,490 A | 5/1905 | Ernst | |
| 3,715,085 A | 2/1973 | Kobayashi et al. | B65H 75/08 83/649 |
| 3,730,409 A | 5/1973 | Ratti | |
| 3,737,087 A | 6/1973 | Rooklyn | |
| 3,949,918 A | 4/1976 | Golner et al. | |
| 3,998,308 A | 12/1976 | Yeakley | |
| 4,122,738 A | 10/1978 | Granger | |
| 4,165,138 A | 8/1979 | Hedge et al. | |
| 4,170,390 A | 10/1979 | McCabe | |
| 4,270,818 A | 6/1981 | McCabe | |
| 4,573,750 A | 3/1986 | Golby | |
| 4,666,099 A | 5/1987 | Hoffman et al. | |
| 4,676,131 A | 6/1987 | Cassia | |
| 4,676,559 A | 6/1987 | Hood et al. | |
| 4,717,043 A | 1/1988 | Groover et al. | |
| 4,721,265 A | 1/1988 | Hawkins | |
| 4,738,176 A | 4/1988 | Cassia | |

(Continued)

FOREIGN PATENT DOCUMENTS

| | | |
|---|---|---|
| WO | WO 99/59457 | 11/1999 |
| WO | WO 00/63100 | 10/2000 |

(Continued)

OTHER PUBLICATIONS

"The International Dispensing System" Catalog, Dispensing Dynamics International, 2010, pp. 1-60.

*Primary Examiner* — Russell D Stormer
(74) *Attorney, Agent, or Firm* — Knobbe, Martens, Olson & Bear, LLP

(57) ABSTRACT

A paper sheet material dispenser apparatus for dispensing paper sheet material from a roll of paper sheet material having a tail portion includes a sensor structure having a light emitter and a light sensor for sensing the absence of a replacement tail portion projecting from a housing exit opening and for activating an electric motor to rotate a roll support drum and cause the replacement tail portion to project from the exit opening.

5 Claims, 7 Drawing Sheets

(56) References Cited

U.S. PATENT DOCUMENTS

| | | | | |
|---|---|---|---|---|
| 4,786,005 | A | 11/1988 | Hoffman et al. | |
| 4,790,490 | A | 12/1988 | Chakravorty | |
| 4,796,825 | A | 1/1989 | Hawkins | |
| 4,826,262 | A | 5/1989 | Hartman et al. | |
| 4,848,854 | A | 7/1989 | Kennedy | |
| 4,960,248 | A | 10/1990 | Bauer et al. | |
| 5,131,302 | A | 7/1992 | Watanabe | |
| 5,244,263 | A | 9/1993 | Kennedy | |
| 5,335,811 | A | 8/1994 | Morand | |
| 5,340,045 | A | 8/1994 | Arabian et al. | |
| 5,375,920 | A | 12/1994 | Macchi Cassia | |
| 5,417,783 | A | 5/1995 | Boreali et al. | |
| 5,441,189 | A | 8/1995 | Formon et al. | |
| 5,452,832 | A | 9/1995 | Niada | |
| 5,630,526 | A | 5/1997 | Moody | |
| 5,657,945 | A | 8/1997 | Bryant | |
| 5,691,919 | A | 11/1997 | Gemmell et al. | |
| 5,772,291 | A | 6/1998 | Byrd et al. | |
| 5,816,514 | A | 10/1998 | Duclos et al. | |
| 5,878,381 | A | 3/1999 | Gemmell et al. | |
| 6,012,664 | A | 1/2000 | Duclos et al. | |
| 6,069,354 | A | 5/2000 | Alfano | |
| 6,079,305 | A | 6/2000 | Bloch et al. | |
| 6,105,898 | A | 8/2000 | Byrd et al. | |
| 6,112,631 | A | 9/2000 | Van Alstine | |
| 6,206,322 | B1 | 3/2001 | Elliot et al. | |
| 6,293,486 | B1 | 9/2001 | Byrd et al. | |
| 6,314,850 | B1 | 11/2001 | Morand | |
| 6,363,824 | B1 | 4/2002 | Granger | |
| 6,412,655 | B1 | 7/2002 | Stuetzel et al. | |
| 6,412,679 | B2 | 7/2002 | Formon et al. | |
| 6,419,136 | B2 | 7/2002 | Formon et al. | A47K 10/36 225/10 |
| 6,446,901 | B1 | 9/2002 | Haen et al. | |
| 6,553,879 | B2 | 4/2003 | Morand | |
| 6,592,067 | B2 | 7/2003 | Denen et al. | |
| 6,695,246 | B1 | 2/2004 | Elliott et al. | |
| 6,820,785 | B2 | 11/2004 | Kapiloff | A47K 10/36 225/10 |
| 6,854,684 | B2 | 2/2005 | Byrd et al. | |
| 6,892,620 | B2 | 5/2005 | Kapiloff | |
| 6,977,588 | B2 | 12/2005 | Schotz et al. | |
| 6,988,689 | B2 | 1/2006 | Thomas et al. | |
| 7,044,421 | B1 | 5/2006 | Omdoll et al. | |
| 7,168,602 | B2 | 1/2007 | Broehl | |
| 7,182,288 | B2 | 2/2007 | Denen et al. | |
| 7,191,977 | B2 | 3/2007 | Denen et al. | |
| 7,296,765 | B2 | 11/2007 | Rodrian | |
| 7,325,767 | B2 | 2/2008 | Elliott et al. | |
| 7,325,768 | B2 | 2/2008 | Byrd et al. | |
| 7,341,170 | B2 | 3/2008 | Boone | |
| 7,354,015 | B2 | 4/2008 | Byrd et al. | |
| 7,398,944 | B2 | 7/2008 | Lewis et al. | |
| 7,500,420 | B2 | 3/2009 | Cvjetkovic et al. | |
| 7,987,756 | B2 | 8/2011 | Lewis et al. | |
| 8,082,827 | B2 | 12/2011 | Friesen et al. | |
| 8,382,026 | B2 * | 2/2013 | Keily | A47K 10/34 242/563 |
| 8,528,851 | B2 * | 9/2013 | Friesen | A47K 10/36 242/563 |
| 8,555,761 | B2 | 10/2013 | Keily et al. | |
| 8,657,225 | B2 * | 2/2014 | Hagleitner | A47K 10/36 242/564.4 |
| 8,740,129 | B2 * | 6/2014 | Keily | A47K 10/3625 242/563 |
| 8,833,691 | B1 * | 9/2014 | Zosimadis | B65H 16/005 242/563.2 |
| 9,730,559 | B2 | 8/2017 | Keily et al. | |
| 2002/0088837 | A1 | 7/2002 | Formon et al. | |
| 2008/0128446 | A1 | 6/2008 | Kuehneman et al. | |
| 2010/0102101 | A1 | 4/2010 | Keily et al. | |
| 2010/0301157 | A1 * | 12/2010 | Keily | A47K 10/34 242/564.1 |
| 2011/0133019 | A1 | 6/2011 | Keily et al. | |
| 2011/0168831 | A1 | 7/2011 | Mok et al. | |
| 2012/0167739 | A1 | 7/2012 | Lewis et al. | |

FOREIGN PATENT DOCUMENTS

| | | | |
|---|---|---|---|
| WO | WO 2007/068269 | A1 | 6/2007 |
| WO | WO 2009/082294 | A1 | 7/2009 |
| WO | WO 2010/062327 | A1 | 6/2010 |
| WO | WO 2010/138106 | A1 | 12/2010 |
| WO | WO 2011/100056 | A1 | 8/2011 |
| WO | WO 2013/169438 | A1 | 11/2013 |
| WO | WO 2014/120352 | A1 | 8/2014 |
| WO | WO 2015/116440 | A1 | 8/2015 |
| WO | WO 2015/156935 | A1 | 10/2015 |

* cited by examiner

ELECTRO-MECHANICAL PAPER SHEET MATERIAL DISPENSER WITH TAIL SENSOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

This invention relates to apparatus selectively operable to dispense paper toweling or other paper sheet material from a roll.

BACKGROUND OF THE INVENTION

Many dispenser systems are known in the prior art for dispensing paper toweling and paper tissue from rolls thereof. With respect to paper toweling, in some cases the paper toweling is comprised of individual paper towel segments separated by perforated tear lines, and in others the toweling has no perforated tear lines formed therein, severing or cutting individual sheets from the toweling accomplished by some suitable severing structure incorporated in the dispenser.

Many towel dispensers of a purely mechanical nature have been developed and utilised over the years for dispensing paper towels, including dispensers which are actuated by a user grasping and pulling on a tail of the toweling extending from the dispenser housing.

For example, U.S. Pat. Nos. 6,314,850 and 6,553,879 disclose apparatus for dispensing paper toweling including a rotatable toweling support roller and a cutter blade pivotally mounted on the outer peripheral portion of the roller. The blade, is movable between a first position in which the cutting edge of the blade is positioned closely adjacent to the outer peripheral portion and a second position in which the blade is disposed at an angle relative to the outer peripheral portion with the cutting edge of the blade spaced from the toweling support roller. The cutter blade when in the second position projects in a direction generally opposed to the direction of rotation of the toweling support roller. Pulling force exerted on the toweling by a user not only serves to rotate the toweling support roller but also causes the toweling to bear against the cutting edge of the cutter blade to sever the toweling.

The apparatus of U.S. Pat. Nos. 6,314,850 and 6,553,879 has met with considerable commercial success; however, some problems with "tabbing" have occurred during use of the dispenser. Tabbing occurs when a piece of towel tears from the sheet when a user grasps and pulls the paper. Tabbing may occur with one or two hand pulls. Papers that absorb water at the greatest rate are most likely to tab, the rate of water absorbency varying by paper manufacturer and grade. Tabbing also becomes a particular problem when low basis weight paper is to be dispensed. It is not an exaggeration to say that virtually all paper towel dispensers of a purely mechanical nature which rely on direct pulling of the toweling by a user to transport the toweling and actuate moveable cutter or severing blades have a tabbing problem to some extent.

Electro-mechanical dispensers employing an electric motor to transport toweling and actuate cutter mechanisms are also well known. Such arrangements include both dispensers which are manually actuated, as by means of a push button and those employing a sensor, such as a sensor sensing proximity of a user's hand, to initiate operation.

U.S. Pat. No. 6,820,785 issued Nov. 23, 2004, discloses an electro-mechanical roll towel dispenser including a housing with a roll carrier disposed therein to rotatably support a roll of towel material. An electro-mechanical feed mechanism is disposed in the housing to dispense measured sheets of the towel material. The feed mechanism operates in a first mechanical operational mode wherein the towel sheets are dispensed by a user grasping and pulling on a tail of the towel material extending from the housing, and a second electrical operational mode wherein a measured length of a next sheet is automatically fed from the housing to define the tail for the next user.

The dispenser of U.S. Pat. No. 6,820,785 includes a sensor for detecting a parameter that is changed by an initial pull exerted on a tail of a web of material extending from the opening of the dispenser. The sensor also generates a signal sent from the sensor to a control circuit or circuitry causing the motor employed in the apparatus to drive the feed mechanism until a measured length of web material that includes the tail of web material has been fed from the dispenser in the form of a measured sheet for subsequent removal by the user.

Similar devices are disclosed in U.S. Pat. No. 3,730,409 and Patent Publication Document WO 00/63100. The devices of these latter two documents have sensors for detecting movement of a tail end of web material such that the feed mechanism is activated in response to detecting the movement.

U.S. Pat. No. 8,382,026, issued Feb. 23, 2013, relates to a multi-function paper towel dispenser selectively operable to dispense paper toweling from a roll of paper toweling employing a plurality of alternative operational modes. The desired mode of operation can be selected utilizing control switches associated with sensor structure and electronic control circuitry of the dispenser. The multi-function paper towel dispenser is characterized not only by its versatility, but by its relative simplicity, ease of use and reliability in any of the operational modes selected. Two of the modes are a paper hidden mode and a paper exposed mode, each of which utilizes sensor structure in combination with electronic control circuitry to operate an electric motor driven rotatable toweling support roller to partially cut and dispense the paper toweling. The electric motor is also utilized to rotate the paper toweling support roller when not employing the sensor structure, the motor essentially operating in a hybrid mode wherein a pull force exerted on the toweling tail initiates rotation of the toweling support roller, the electric motor then being energized to reduce the pull force required by a user to effect final dispensing of a towel. Furthermore, a user can manually rotate the paper toweling support roller to effect dispensing of a towel in any of the modes.

The sensor structure of the multi-function paper towel dispenser is operatively associated with the electric motor to energize the electric motor and cause rotation of the toweling support roller to transport the paper toweling for dispensing from the dispenser in either a first mode of operation wherein the electric motor is energized responsive to the sensor structure sensing positioning of a user's hand at a predetermined location external of the housing or in a second mode of operation wherein the electric motor is energized responsive to the sensor structure sensing the removal of a toweling tail from a location external of the housing.

The following documents are also believed to be representative of the current state, of the prior art in this field: U.S. Pat. No. 8,555,761, issued Oct. 15, 2013, U.S. Pat. No. 3,715,085, issued Feb. 6, 1973, U.S. Pat. No. 3,730,409, issued May 1, 1973, U.S. Pat. No. 3,737,087, issued Jun. 5, 1973, U.S. Pat. No. 3,949,918, issued Apr. 13, 1976, U.S. Pat. No. 3,998,308, issued Dec. 21, 1976, U.S. Pat. No. 4,666,099, issued May 19, 1987, U.S. Pat. No. 4,676,131, issued Jun. 30, 1987, U.S. Pat. No. 4,721,265, issued Jan. 26, 1988, U.S. Pat. No. 4,738,176, issued Apr. 19, 1988, U.S. Pat. No. 4,790,490, issued Dec. 13, 1988, U.S. Pat. No. 4,796,825, issued January 1989, U.S. Pat. No. 4,960,248, issued Oct, 2, 1990, U.S. Pat. No. 5,131,302, issued Jul. 21, 1992, U.S. Pat. No. 5,452,832, issued Sep. 26, 1995, U.S. Pat. No. 5,772,291, issued Jun. 30, 1998, U.S. Pat. No. 6,079,305, issued Jun. 27, 2000, U.S. Pat. No. 6,105,898, issued Aug. 22, 2000, U.S. Pat. No. 6,412,655, issued Jul. 2, 2002, U.S. Pat. No. 6,412,679, issued Jul. 2, 2002, Patent Document No. WO 9959457, dated November 1999, Patent Document No. WO 0063100, dated October, 2000, U.S. Pat. No. 7,398,944, issued Jul. 15, 2008, U.S. Pat. No. 6,892,620, issued May 17, 2005, U.S. Pat. No. 7,044,421, issued May 16, 2006, U.S. Pat. No. 4,573,750, issued Mar. 4, 1986, U.S. Pat. No. 4,826,262, issued May 2, 1989, U.S. Pat. No. 6,446,901, issued Sep. 10, 2002, U.S. Pat. No. 4,270,818, issued Jun. 2, 1981, U.S. Pat. No. 6,112,631, issued Sep. 5, 2000, U.S. Pat. No. 5,375,920, issued Dec. 27, 1994, U.S. Pat. No. 7,354,015, issued Apr. 8, 2008, U.S. Pat. No. 6,419,136, issued Jul. 16, 2002, U.S. Pat. No. 5,441,189, issued Aug. 15, 1995, U.S. Pat. No. 5,878,381, issued Mar. 2, 1999, U.S. Pat. No. 5,691,919, issued Nov. 25, 1997, U.S. Pat. No. 5,340,045, issued Aug. 23, 1994, U.S. Pat. No. 5,335,811, issued Aug. 9, 1994, U.S. Pat. No. 5,244,263, issued Sep. 14, 1993, U.S. Pat. No. 4,848,854, issued Jul. 18, 1989, U.S. Pat. No. 4,270,818, issued Jun. 2, 1981, U.S. Pat. No. 4,170,390, issued Oct. 9, 1979, U.S. Pat. No. 5,657,945, issued Aug. 19, 1997, U.S. Pat. No. 4,122,738, issued Oct. 31, 1978, U.S. Pat. No. 6,012,664, issued Jan. 11, 2000, U.S. Pat. No. 5,816,514, issued Oct. 6, 1998, U.S. Pat. No. 5,417,783, issued May 23, 1995, U.S. Pat. No. 4,717,043, issued Jan. 5, 1988, U.S. Pat. No. 5,630,526, issued May 20, 1997, U.S. Pat. No. 6,363,824, issued Apr. 2, 2002, U.S. Pat. No. 6,293,486, issued Sep. 25, 2001, U.S. Pat. No. 6,695,246, issued Feb. 24, 2004, U.S. Pat. No. 6,854,684, issued Feb. 15, 2005, U.S. Pat. No. 6,988,689, issued Jan. 24, 2006, U.S. Pat. No. 7,325,767, issued Feb. 5, 2008, U.S. Pat. No. 7,325,768, issued Feb. 5, 2008, U.S. Pat. No. 7,168,602, issued Jan. 30, 2007, U.S. Pat. No. 6,592,067, issued Jul. 15, 2003, U.S. Pat. No. 7,341,170, issued Mar. 11, 2008, U.S. Pat. No. 7,182,288, issued Feb. 27, 2007, U.S. Pat. No. 7,296,765, issued Nov. 20, 2007, U.S. Pat. No. 6,977,588, issued Dec. 20, 2005 and U.S. Pat. No. 6,820,785, issued Nov. 23, 2004.

It is known in the prior art (including U.S. Pat. No. 8,382,026 indicated above) to employ a hand operated knob or handle operatively connected to a paper sheet advancement roller to act as a back-up sheet advancement mechanism. However it has been found that in certain circumstances in which a user gasps a tail portion of the toweling protruding from the dispenser to initiate operation of dispenser and tears off the sheet instead of pulling it through the internal mechanism (for example a switch on the toweling support roller) employed to advance the remaining sheet material so that a new tail portion is presented, the motor switch will not be activated and thus a new tail will not be presented. The end result is that the user will need to touch and turn the knob in order to advance a tail. Touching the knob defeats the purpose of having an electrically assisted dispenser.

DISCLOSURE OF INVENTION

The present invention relates to sheet material dispenser apparatus for dispensing paper sheet material from a roll of paper sheet material having an existing tail portion.

The apparatus includes a housing having a housing interior and defining an opening communicating with said housing interior. A roll support is within said housing interior for rotatably supporting the roll of paper sheet material.

The apparatus also includes a rotatable sheet material support roller for receiving paper sheet material from the roll of paper sheet material, the sheet material support roller having a cylindrically-shaped outer peripheral surface. An electric motor is operatively associated with the sheet material support roller for rotating the sheet material support roller.

An electric switch is operatively associated with the electric motor and with the sheet material support roller. The electric switch is responsive to rotation of the sheet material support roller caused by a user of the paper sheet material dispenser apparatus pulling on the existing tail portion projecting through and beyond the opening to a first position to energize said electric motor and cause rotation of the sheet material support roller by the electric motor from the first position to a second position.

A cutter blade is provided for substantially or completely severing the paper sheet material during rotation of the sheet material support roller to allow manual removal of a sheet having the existing tail portion.

Sensor structure is located at or closely adjacent to the opening including at least one IR emitter and at least one IR receiver for sensing whether a replacement tail portion of the roll of paper sheet material projects through and beyond said opening after removal of the sheet having the existing tail portion. The sensor structure is in operative association with the motor and responsive to failure to sense a replacement tail portion energizing said motor to further rotate the rotatable sheet material support roller and cause said replacement tail portion to pass through and project from said opening.

Other features, advantages and objects of the present invention will become apparent with reference to the following description and accompanying drawings.

BEST MODE FOR CARRYING OUT THE INVENTION

Figure 1:
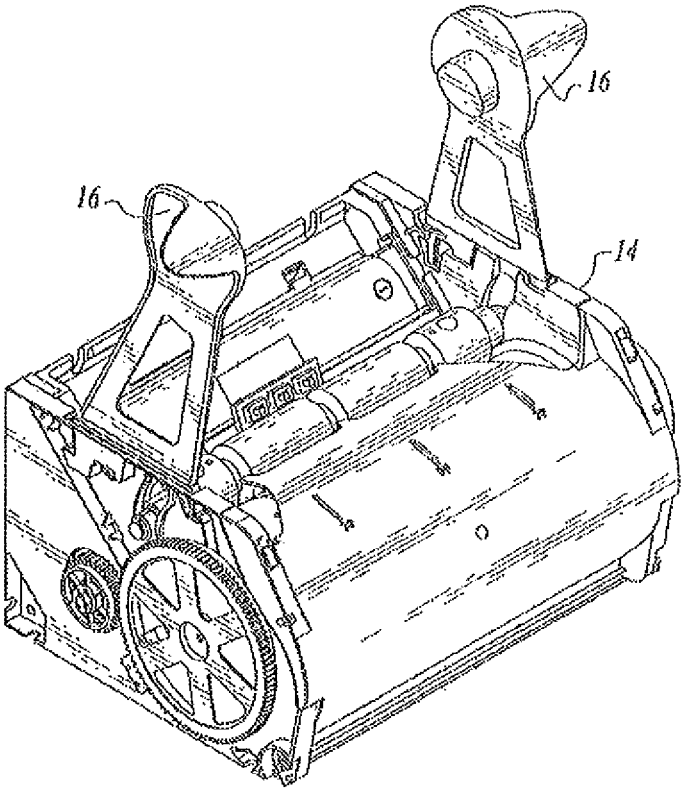
FIG. 1 is a front, perspective view illustrating internal components of a multi-function paper toweling dispenser.
Figure 2:
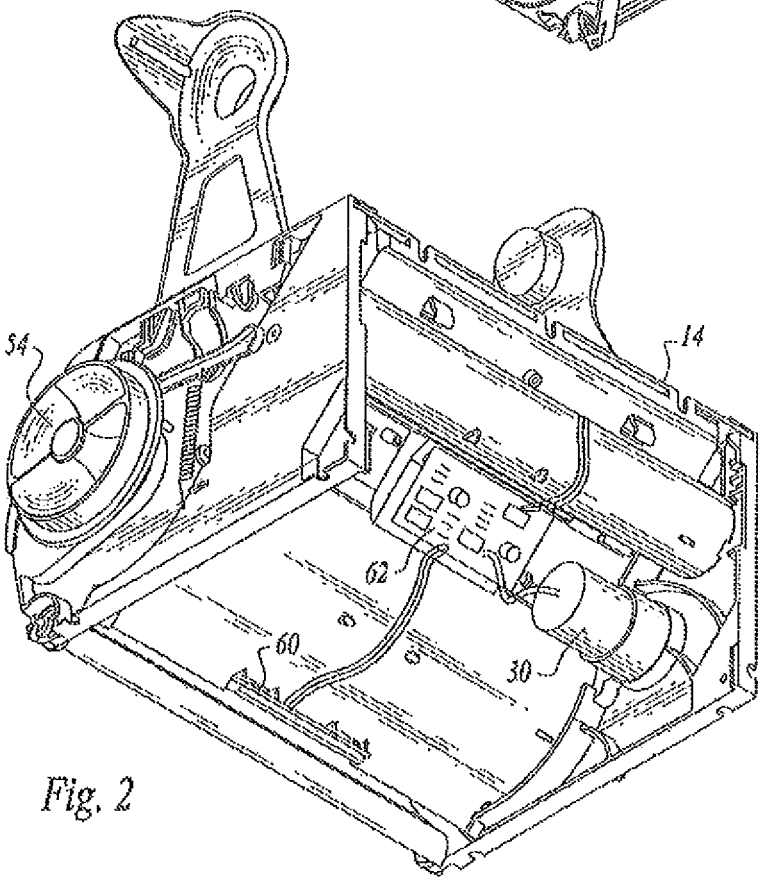
FIG. 2 is a back, perspective view of the components.
Figure 4:
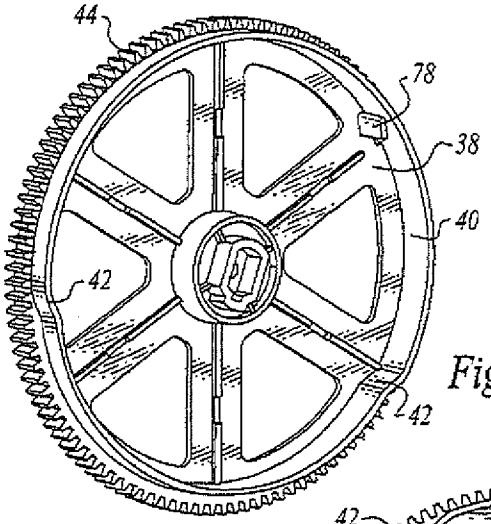
FIG. 4 is a perspective view illustrating a drive gear of the toweling support roller.
Figure 5:
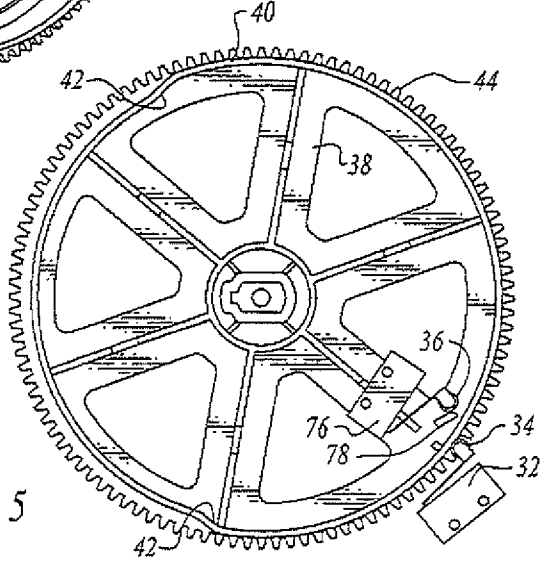
FIG. 5 is a side elevational view of the drive gear of the toweling support roller and illustrating mechanical electric switches employed therewith.
Figure 3:
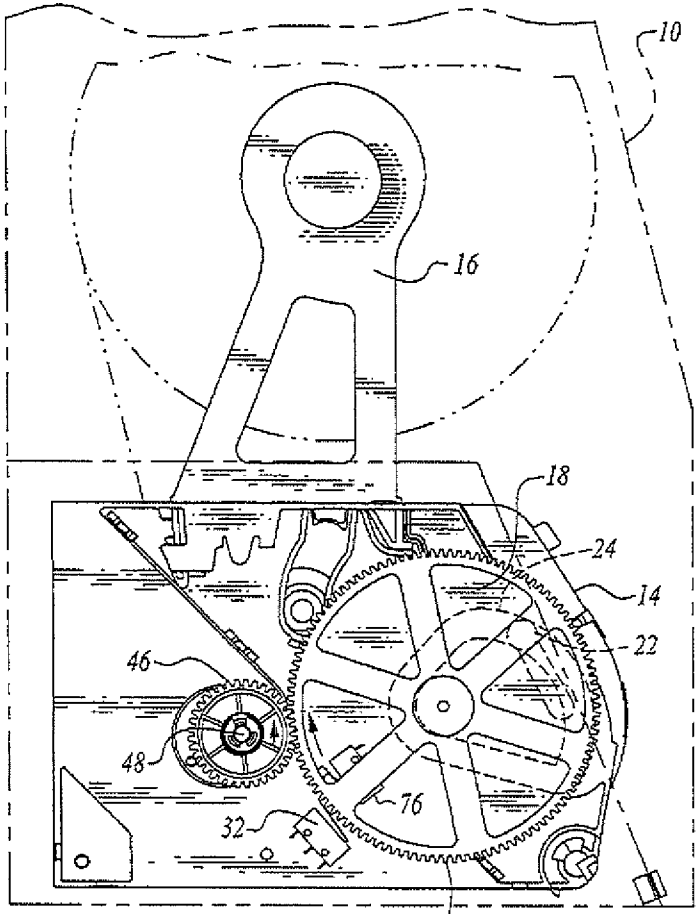
FIG. 3 is a side, elevational view showing the structure illustrated in FIG. 3 in solid lines, a housing and a supply roll of toweling being shown in phantom lines.

Referring now to the drawings, a multi-function paper towel dispenser constructed in accordance with the teachings of the present invention is illustrated. As explained and disclosed in greater detail below, the dispenser is selectively operable to dispense paper toweling from a roll of paper toweling employing a plurality of alternative operational mode, one of the modes being a "hybrid" mode wherein an electric motor assists user to reduce pull force or provide a tail.

FIGS. 1-20 are the same as the corresponding drawing figures in U.S. Pat. No. 8,382,026, referenced above.

FIGS. 21-27 hereof relate to structural components and operations carried out thereby of the present invention that are not disclosed in U.S. Pat. No. 8,382,026.

The paper towel dispenser disclosed in U.S. Pat. No. 8,382,026 and incorporated herein by reference includes a housing 10 (shown in FIGS. 3, 9-10, 13, 14, 17, 19 and 22-26), the housing having a towel dispensing opening 12 at the bottom thereof.

Mounted in the interior of the housing 10 is an assembly 14 (see FIGS. 1-3) including operational structural components of the multi-function paper towel dispenser. These structural elements include a roll support in the form of spaced support arms 16 insertable into the open ends of a supply roll of paper toweling in a conventional fashion.

A rotatable toweling support roller 18 has a cylindrically-shaped outer peripheral surface and is rotatable in a predetermined direction of rotation. A cutter blade 20 (see FIG. 10) is mounted on the roller.

A cam follower 22 and cam system 24 (FIG. 3) are employed with the blade 20 and are suitably those disclosed in U.S. Pat. Nos. 6,314,850 and 6,553,879, the teachings of which are incorporated by reference into this application.

Rotation of toweling support roller 18 will cause the cam followers to move along the cam surfaces defining the channels. This, in turn, will cause the cutter blade 20 to pivot relative to the toweling support roller 18.

The cutter blade is movable between an inactive position wherein the cutter will not sever the toweling and a severing position wherein the cutter blade is positioned outwardly of the toweling support roller to at least partially sever the toweling on the toweling support roller.

An electric motor 30 is operatively associated with the toweling support roller for selectively rotating the toweling support roller. A mechanical electric switch 32 is operatively associated with the electric motor and with the toweling support roller. The electric switch is electrically connected to the electric motor through a microprocessor of circuit board 62.

The electric switch 32 is responsive to rotation of the toweling support roller 18 by a user of the dispenser from a rest or inactive position to a first position to energize the electric motor whets the toweling support roller reaches the first position and cause rotation of the toweling support roller by the electric motor from the first position to a second position and reducing the pull force required by a user pulling the paper toweling during rotation of the toweling support roller between the first position and the second position. Further, the mechanical electrical switch 32 is responsive to rotation of the toweling support roller beyond the second position to deenergize the electric motor. This mode of operation, sometimes hereinafter referred by as a hybrid or third mode of operation, is described in more detail below.

Mechanical electric switch 32 includes a switch actuator element 34 having a roller 36 at the end thereof which is biased into engagement with a circular end 38 of the toweling support roller 18. The switch actuator element 32 alternatively opens or closes the switch during rotation of the toweling support roller.

Located at circular end 3S of the toweling support roller and engaged by the switch actuator element roller during rotation of the toweling support roller is an arcuate projection 40. The projection extends only part way along the periphery of the toweling support roller and has two tapered projection ends 42. Extending completely about circular end 38 and disposed inwardly of the arcuate projection is a toweling support roller gear 44 having teeth. Meshing with the teeth of the toweling support roller gear are teeth of a drive gear 46 which is driven by electric motor 30, the latter suitably being in the form of a DC gear motor. A one-way clutch needle bearing 48 connects the drive gear to the electric motor to allow the performance of certain functions indicated below. Electric wiring connects the switch 32 to the electric motor through a microprocessor.

Figure 6:
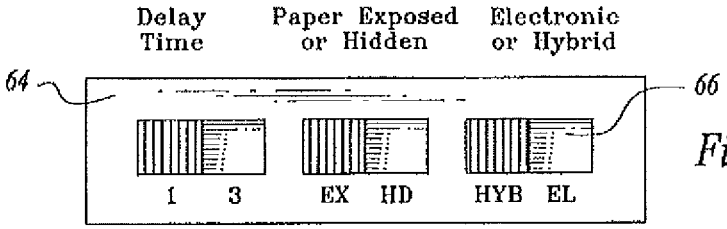
FIG. 6 is a plan view illustrating a switch panel having mode selection control switches and a time delay control switch.
Figure 7:
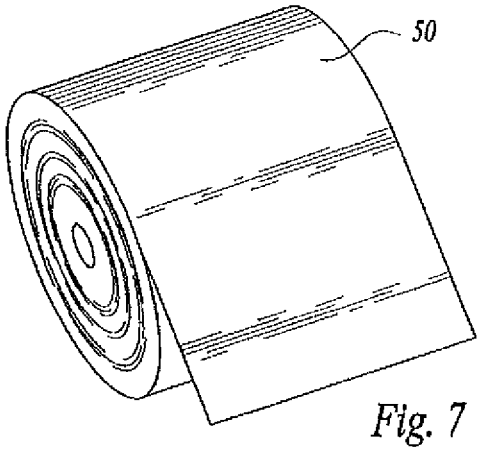
FIG. 7 is a perspective view of an unperforated supply roll of toweling that may be utilized in the multi-function paper towel dispenser.

FIGS. 6-10 may now be referred to in connection with operation of the multi-function paper towel dispenser in the third or hybrid mode. In such mode the roll of uncut or unperforated toweling 50 as shown in FIG. 7 would be used as the supply roll. FIG. 6 shows the setting of a control switch 66 to the hybrid setting, the hybrid mode of operation being but one of the mode of operation options, as will be explained in greater detail below.

Figure 8:
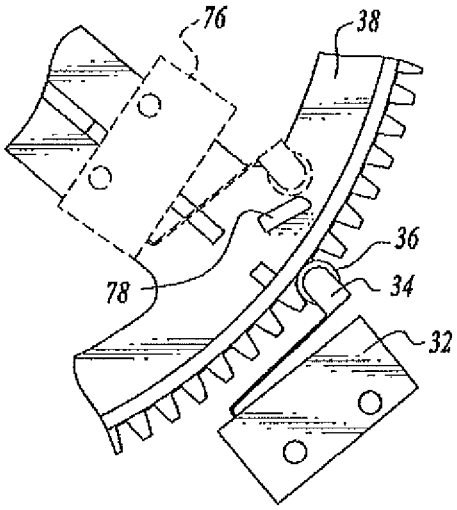
FIG. 8 is a greatly enlarged, side view illustrating a portion of the drive gear of the toweling support roller and its relationship with mechanical electric switches, one of which is shown in solid lines and the other in dash lines.
Figure 9:
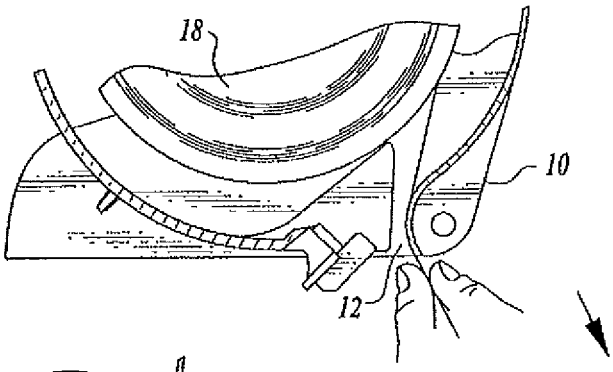
FIG. 9 shows a towel tail being grasped and dispensed when the control switches are in the position shown in FIG. 6.

FIG. 8 shows mechanical electric switch 32 being utilized in this mode of operation as indicated above. FIG. 9 shows a user manually grasping the tail of the toweling and pulling it to initiate rotation of the toweling support roller 18. Further pulling of the toweling energizes the electric motor to power rotation of the toweling support roller when the switch 32 is operated. The switch may be incorporated in a manually operated knob such as that disclosed in co-pending U.S. patent application Ser. No. 13/317,492, filed Oct. 19, 2011.

Figure 10:
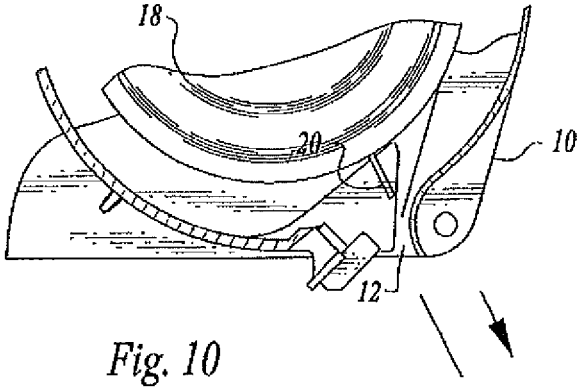
FIG. 10 illustrates the positioning of the toweling after a towel sheet has been removed by the user.

FIG. 10 illustrates a severed toweling section removed from the dispenser and a new tail moving into place to extend to a position under the housing where it can be manually grasped and pulled by the next user. The toweling tail may be brought to such position by manually rotating the toweling dispenser roller 18 by a rotatable manually engageable element in the form of a handle or knob 54 connected to the toweling support roller. A one-way clutch (not shown) may be employed to ensure that the toweling support roller is being rotated in a direction to advance toweling. The handle 54 can also be used to advance and dispense the toweling if the batteries fail. The user can pull on the tail as usual when not utilizing the apparatus without motor assistance. In this situation, the required pull force is still relatively low since the gear motor is in effect disengaged from the toweling support roller by employing a one-way clutch needle bearing or some other one-way clutch mechanism.

The multi-function paper towel dispenser incorporates sensor structure operatively associated with the electric motor to energize the electric motor and cause rotation of the toweling support roller to transport the paper toweling for dispensing. This sensor structure is utilized in conjunction with electronic control circuitry in a manner which will now be described.

The sensor structure is identified by reference numeral 60 and employs a "bouncing" technology in the infrared spectrum that bounces a wave off a hand or paper to activate the unit. That is, the sensor structure is operatively associated with the electric motor to energize the electric motor and cause rotation of the toweling support roller to transport the paper toweling for dispensing from the multi-function paper toweling dispenser in either first mode of operation wherein the electric motor is energized responsive to the sensor structure sensing positioning of a user's hand or other object at a predetermined location external of the housing or in a second mode of operation wherein the electric motor is energized responsive to the sensor structure sensing the removal of a toweling tail from a location external of the housing.

The control switch panel 64 and control switches shown in FIGS. 6, 11, 16, and 18 are associated with an electronic circuit board and utilized to select the various modes in which the multi-function paper towel dispenser can operate. Switch 66 is employed to switch between the hybrid mode of operation described above and an electronic mode of operation wherein the sensor structure 60 and control circuitry are utilized to operate the dispenser in either a paper hidden mode (hereinafter sometimes referred to as the first mode) of operation or a paper exposed mode (sometimes hereinafter referred to as the second mode of operation). Switch 68 of the switch display selects either the paper hidden mode or the paper exposed mode. A third switch 70 is utilized to set and adjust the time delay between cycles, for example approximately one second or approximately three seconds. When the switch 66 is set to hybrid operation, the switches 68 and 70 for exposed paper or hidden paper operation are inactive.

Figure 11:
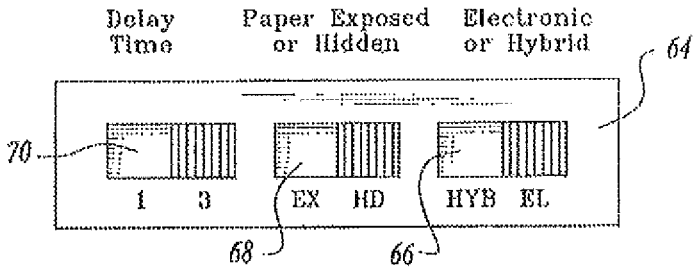
FIG. 11 is a view similar to FIG. 6, but illustrating the condition of the control switches during a different mode of operation.
Figure 13:
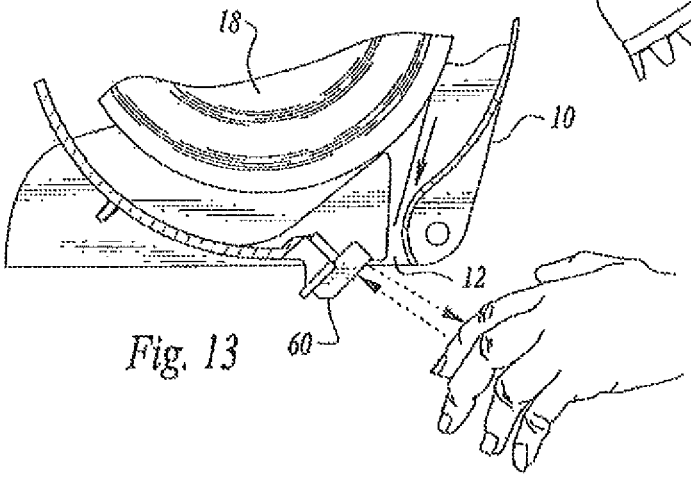
FIG. 13 is a view similar to FIG. 9, but illustrating initial dispensing of a towel in response to a sensed user's hand.
Figure 15:
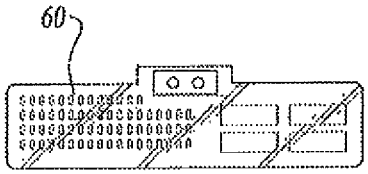
FIG. 15 is a plan view illustrating sensor structure of the multi-function, paper towel dispenser.

FIG. 11 illustrates switch 66 set for electronic control and switch 68 set for the paper hidden or first mode of operation wherein the electric motor is energized responsive to the sensor structure sensing positioning of a user's hand at a predetermined location external of the housing. FIG. 13 illustrates a user's hand positioned where it can be sensed and the infrared wave transmitted by sensor structure 60 being bounced off the hand to the sensor structure receiver. This results in the control circuitry on circuit board 62 energizing the electric motor and causing rotation of the toweling support roller to move the towel tail in a downward direction as illustrated by the arrow and available for grasping and removal by the user.

A second mechanical electric switch 76 is employed when the multi-function paper towel dispenser operates in either the paper hidden mode or paper exposed mode to stop rotation of the toweling support roller when the dispensing cycle is completed. Switch 76 is fixedly mounted adjacent to toweling support roller gear 44 and is engageable during rotation of the toweling support roller by a projection 78 extending from the gear 44. Once the first and second mode mechanical electrical switch 76 is engaged by the projection 78, rotation of the toweling support roller and transport of the toweling will be halted.

During rotation of the toweling support roller the blade associated with the toweling support roller will cut the sheet, the amount of which is controlled by the position of the actuator of mechanical electric switch 76. In a preferred actuator position, the sheet is cut more than ninety percent. This allows the user to easily remove the sheet with a very light pull force. When the sheet is removed by the user, the dispenser will not dispense another sheet until the user puts a hand under the sensor.

Figure 12:
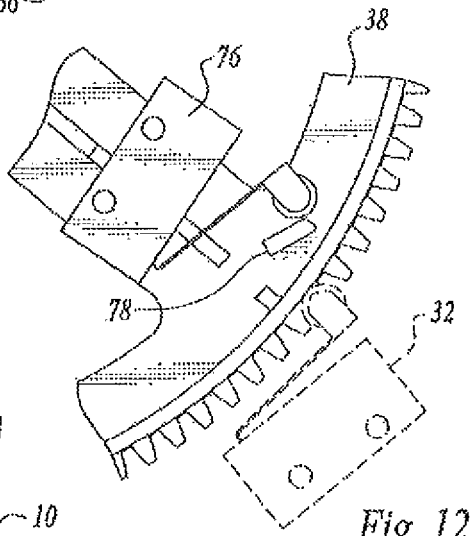
FIG. 12 is a view similar to FIG. 8, but illustrating the condition of the toweling support roller and the mechanical electric switches associated therewith in a different mode of operation as determined by the control switches in FIG. 11 wherein the electric motor is energized responsive to sensor structure sensing positioning of a user's hand.
Figure 14:
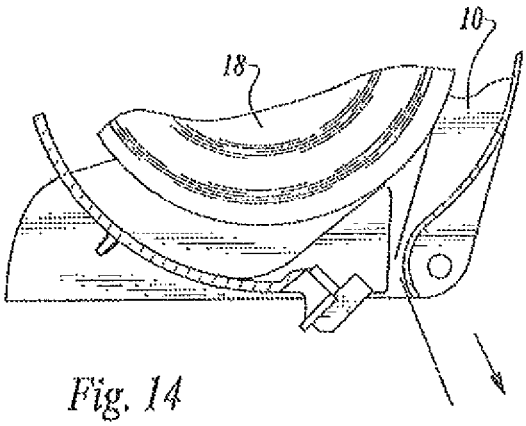
FIG. 14 illustrates a towel removed from the rest of the toweling at the end of the dispensing cycle illustrated.

FIGS. 11, 12 and 14 illustrate operation in the first or paper hidden mode.

Figure 16:
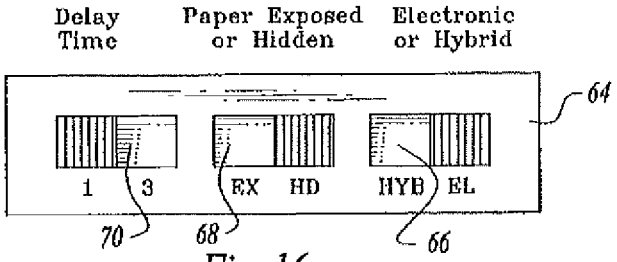
FIG. 16 is a view similar to FIGS. 6 and 11, but illustrating different control switch positions.

FIG. 16 shows the control switch panel with the control switches 66 and 68 in the same positions as shown in FIG. 11, but with switch 70 changed to a position which sets the delay time between cycles to approximately one second as compared to three seconds in FIG. 1.

Figure 17:
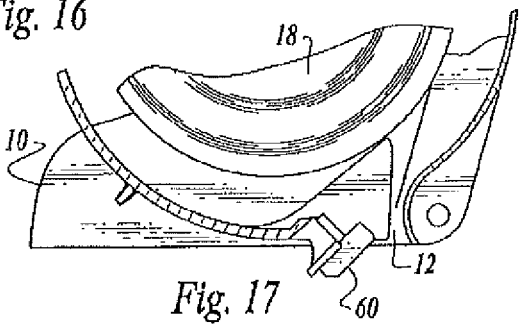
FIG. 17 shows the condition of a toweling tail when hidden as selected by the middle control switch in FIG. 16.

FIG. 17 is a view similar to FIG. 13, but with the paper towel dispenser inactive and with the tail in a hidden position, that is in a position where the tail is essentially non-visible from outside the housing. Again, reactuation will only take place if a hand or other object is in a position relative to the housing and sensor 60 that would initiate the next cycle, which can occur after approximately a second has passed.

Figure 18:
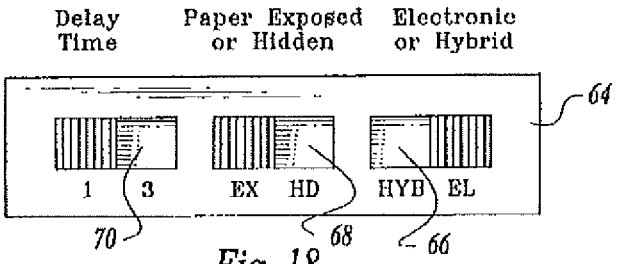
FIG. 18 illustrates the middle switch moved to a position that results in the tail being exposed.
Figure 19:
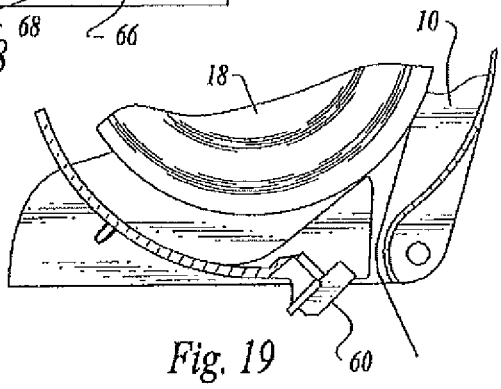
FIG. 19 shows the toweling tail exposed and extending from the bottom of the dispenser housing.
Figure 20:
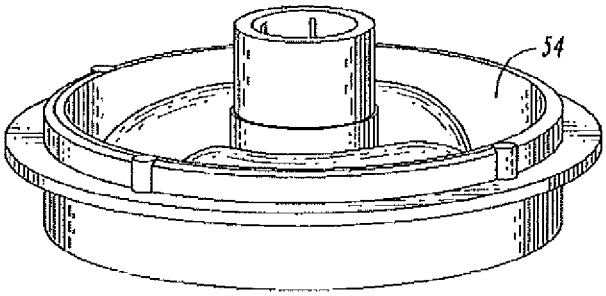
FIG. 20 is a perspective view of a manually graspable turning knob or handle employed to rotate the toweling support roller.

FIG. 18 shows the switch 66 in the electronic control position and switch 68 selecting the paper exposed or second mode of operation wherein the electric motor is energized responsive to the sensor sensing the removal of a toweling tail from a location external of the housing. In this mode the sensor is looking for the presence of a paper tail. As long as the paper tail is covering the sensor's range, the motor remains deenergized. When a user removes the hanging sheet, the lack of paper in front of the sensor will trigger the motor to turn on. The motor turns the toweling support roller until mechanical electric switch 76 is triggered by the projection 78 on the toweling support roller gear 44. Rotation of the toweling support roller will have advanced and cut the sheet, the amount of which is controlled by the switch actuator position of mechanical electric switch 76. In this, mode of operation, the multi-function paper towel dispenser always has a long tail of paper hanging downwardly from the housing, for example 9 inches. In a preferred embodiment, the sheet is pre-cut more than ninety percent. This allows the user to easily remove the sheet with a very light pull force, FIGS. 21-27 show modifications made to the above-described structure in accordance with the teachings of the present invention. The paper sheet, material dispenser apparatus hereof includes the housing 10 having a housing 10 which has an opening 12 at the bottom thereof. Mounted in the interior of the housing 10 is an assembly 14 which is virtually the same as assembly 14 described above including all the structural elements and operational relationships therebetween.

Figure 21:
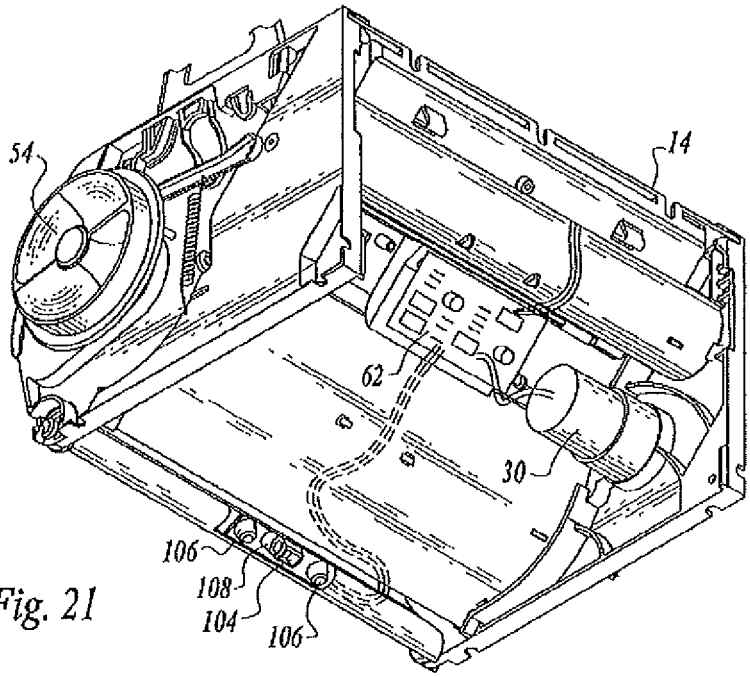
FIG. 21 is a view similar to FIG. 2, but showing a modification of the internal components in accordance with the teachings of the present invention.
Figure 22:
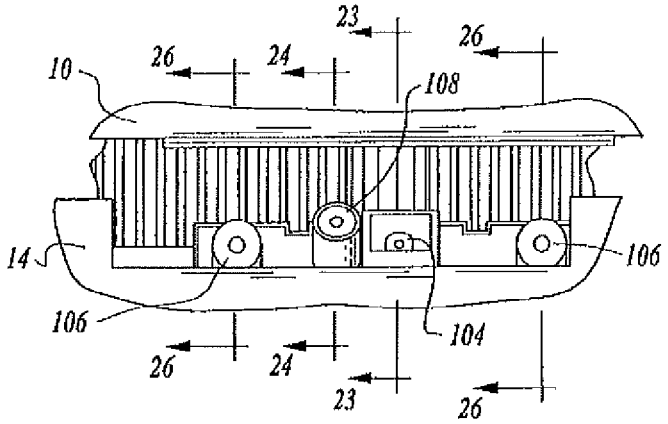
FIG. 22 is a bottom view of a portion of the modified internal components of FIG. 21, including IR emitters and an IR sensor of the present invention.

FIG. 21 for example shows the same electric motor 30, circuit board 62 and handle 54, although with the present invention the necessity of touching and rotating the handle to rotate the toweling support roller and advance toweling is greatly reduced. Reference may be had to FIGS. 1-20 for a depiction of such components hidden from view or not shown in FIGS. 21-27. The reference numerals employed hereinafter are the same as the reference numerals employed for the same structural members elements shown in FIGS. 1-20 and described in depth above.

U.S. Pat. No. 8,555,761 discloses another type of "hybrid" mode wherein an electric motor provides tail if needed. The teachings of U.S. Pat. No. 8,555,761 are incorporated herein by reference. The term "hybrid" encompasses either motor assist type, which could be used in one dispenser, if desired, using a selector switch.

According to the teachings of the present invention as shown in FIGS. 21-27, the sensor structure located at or closely adjacent to the exit opening 12 of the housing 10 includes a plurality of IR emitters in associate with an IR sensor (receiver) 104 for sensing whether a replacement tail portion of toweling projects through and beyond the opening 12 after removal of a sheet with an existing tail by the user. The sensor structure is connected to the motor 30 through a microprocessor and is responsive to failure of the sensor structure to sense a replacement towel portion to energize the motor to further rotate the rotatable toweling support roller and cause the replacement tail portion to pass through and project from the exit opening.

The sensor structure will otherwise operate as described in depth above with respect to the existing functions of the multi-function dispenser.

In the arrangement illustrated, a light sensor (receiver) in the form of one IR sensor (receiver) 104 and three light emitters in the form of three IR emitters, (two emitters 106 and one emitter 108) are employed. IR emitter 108 is utilized in connection with the "exposed" and "hybrid" operations of the multi-function dispenser described above. The "hybrid" operations carried out can be either the motor assist operation of U.S. Pat. No. 8,382,026 or that of U.S. Pat. No. 8,555,761. IR emitters 106 are employed in connection with the "paper hidden" function described above.

In a mechanical hybrid dispensing mode such as "Tail" or "Motor" Assist, as represented by U.S. Pat. No. 8,382,026 and U.S. Pat. No. 8,555,761, the motor is activated by rotation of the sheet material support roller which actuates a mechanical switch. The dispensers are designed to be dispensed by a generally downward pull. If a user tears off the sheet instead of pulling it through the mechanism, the sheet material support roller may not rotate, which prevents the mechanical switch from being activated. Thus a new tail will not be produced. The end result is that the user will need to turn the knob in order to advance a tail. As mentioned above, having to touch the knob defeats the purpose of having an electrically assisted dispenser.

By using a sensor, which may be the same IR sensor used in the exposed or hidden modes, the dispenser can determine if a tail is present. If no tail is present, the motor is turned on to produce a new tail extending through the exit opening.

The sensor may, for example, be turned on momentarily every 2.5 seconds to check for presence of a tail.

Figure 23:
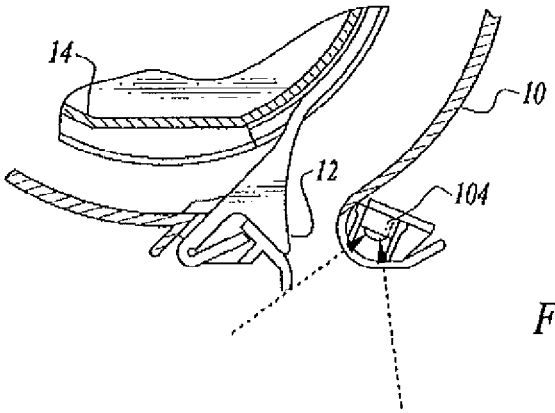
FIG. 23 is an enlarged, cross-sectional view taken along line 23-23 of FIG. 22, no towel tail portion being shown.
Figure 24:
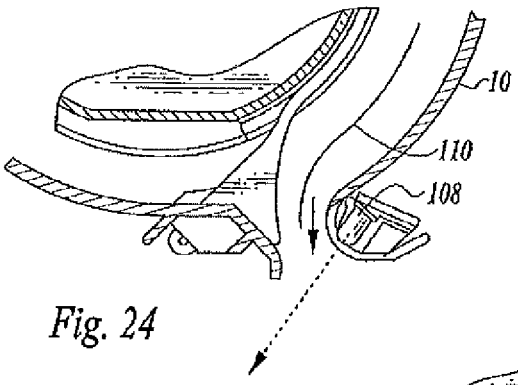
FIG. 24 is an enlarged, cross-sectional view taken along line 24-24 of FIG. 22, a tail portion moving downwardly toward the housing exit opening.
Figure 25:
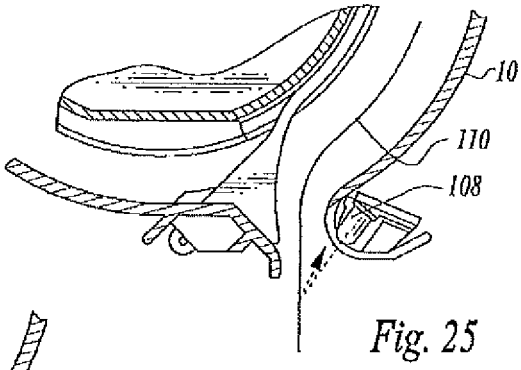
FIG. 25 is an enlarged, cross-sectional view taken along line 24-24 of FIG. 22, a tail portion extending through the housing end opening.

In the arrangement illustrated, the IR emitters 106 are disposed at an angle differing from the angle of IR emitter 108 so that the emitters can perform their assigned functions. FIG. 23 is a schematic illustration showing passage of directed or reflected light received by the IR receiver 104 from different angles. FIG. 24 illustrates a tail portion of toweling 110 moving downwardly prior to sensing by emitter 108. FIG. 25 shows the tail extended through the exit opening and reflected IR light from the extended tail "bounced" back in the direction of the IR receiver 104.

Figure 26:
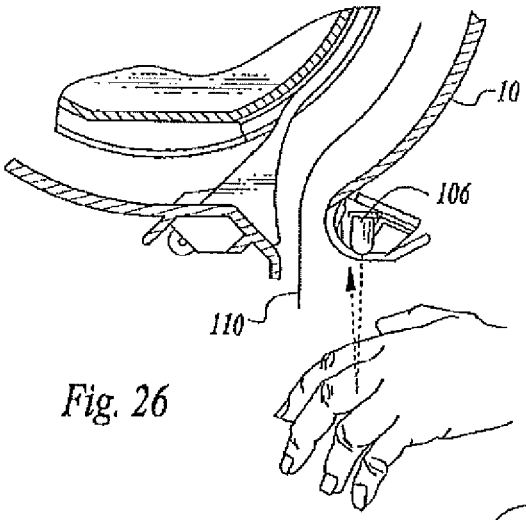
FIG. 26 is an enlarged, cross-sectional view taken along either line 26-26 of FIG. 22 and showing a user's hand.

FIG. 26 shows a "paper hidden" situation wherein the reflected IR light from the emitter [108] *106* is reflected from a user's hand and "bounced" back in the direction of the IR receiver.

Figure 27:
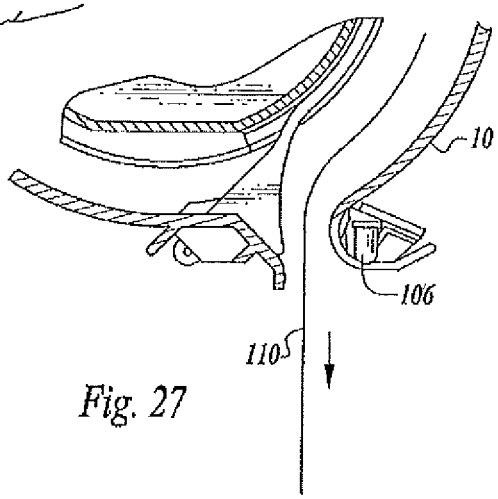
FIG. 27 is an enlarged, cross-sectional view similar to FIG. 26, but illustrating the tail portion extending further in a downward direction.

FIG. 27 shows the toweling 110 moving downwardly after hand sensing has occurred.

The invention claimed is:

1. A multi-function paper sheet material dispenser apparatus for dispensing paper sheet material from a roll of paper sheet material having an existing tail portion, said multi-function paper sheet dispenser apparatus selectively operable to cut and dispense sequential sheets having tail portions from the roll of paper sheet material, *said dispenser apparatus* employing a plurality of operational modes including a hybrid mode comprising either a [hybrid motor] *pull force* assist mode or a [hybrid] tail assist mode, *wherein in each of said pull force assist mode and said tail assist mode, an electric motor is energized responsive to a user pulling on said existing tail portion causing rotation of a rotatable sheet material support roller, wherein said dispenser apparatus comprises*:

a housing having a housing interior and defining an opening communicating with said housing interior;

a roll support within said housing interior for rotatably supporting the roll of paper sheet material;

[a] *said* rotatable sheet material support roller for receiving paper sheet material from the roll of paper sheet material, said sheet material support roller having a cylindrically-shaped outer peripheral surface;

[an] *said* electric motor operatively associated with said sheet material support roller for rotating said sheet material support roller;

a mechanical electric switch operatively associated with said electric motor and with said sheet material support roller, said mechanical electric switch, when said dispenser apparatus is in either said [hybrid motor] *pull force* assist mode or said [hybrid] tail assist mode, responsive to rotation of said sheet material support roller caused by [a] *the* user of the multi-function paper sheet material dispenser apparatus pulling on the existing tail portion projecting through and beyond said opening to a first position to energize said electric motor and cause rotation of said sheet material support roller by said electric motor from said first position to a second position, said mechanical electric switch including a switch actuator element operatively connected to the [toweling] *sheet material* support roller and activating the electric switch to energize said motor and cause said motor to rotate said sheet material support roller after said sheet material support roller has been rotated by the user pulling on the existing tail portion to position the existing tail portion at the first position;

a cutter blade for substantially or completely severing the paper sheet material during rotation of the sheet material support roller to allow manual removal of a sheet having said existing tail portion; and sensor structure including a first light emitter and a first light receiver for controlling operation of said hybrid mode [and a second light emitter and second light receiver] located at or closely adjacent to said opening for sensing whether a replacement tail portion of said roll of paper sheet material projects through and beyond said opening a predetermined distance after manual removal of said sheet having said existing tail portion, said [second] *first* light emitter and said [second] *first* light receiver in operative association with said electric motor, and during operation of the multi-function paper sheet material [dispensing] *dispenser* apparatus in either said [hybrid motor] *pull force* assist mode or said [hybrid] tail assist mode, responsive to failure to sense a replacement tail portion projecting through and beyond said opening said predetermined distance [energizing] said motor *is energized* to further rotate said rotatable sheet material support roller and cause said replacement tail portion to pass through and project from said opening and move to said first position.

2. The multi-function paper sheet material dispenser apparatus according to claim 1 wherein said first [and second] light [emitters are IR emitters] *emitter is an IR emitter*.

3. The multi-function paper sheet material dispenser apparatus according to claim 1 wherein *said sensor structure includes a plurality of light emitters,* at least some of said light emitters [are] oriented in different directions.

4. The multi-function paper sheet material dispenser apparatus according to claim 1 wherein said sensor structure is actuated periodically.

5. The multi-function paper sheet material dispenser apparatus according to claim [1] *3* wherein said [first and second] *plurality of* light emitters are spaced from one another.

* * * * *